No. 792,308. PATENTED JUNE 13, 1905.
W. H. BROWN.
FRICTION CLUTCH.
APPLICATION FILED MAR. 28, 1904.
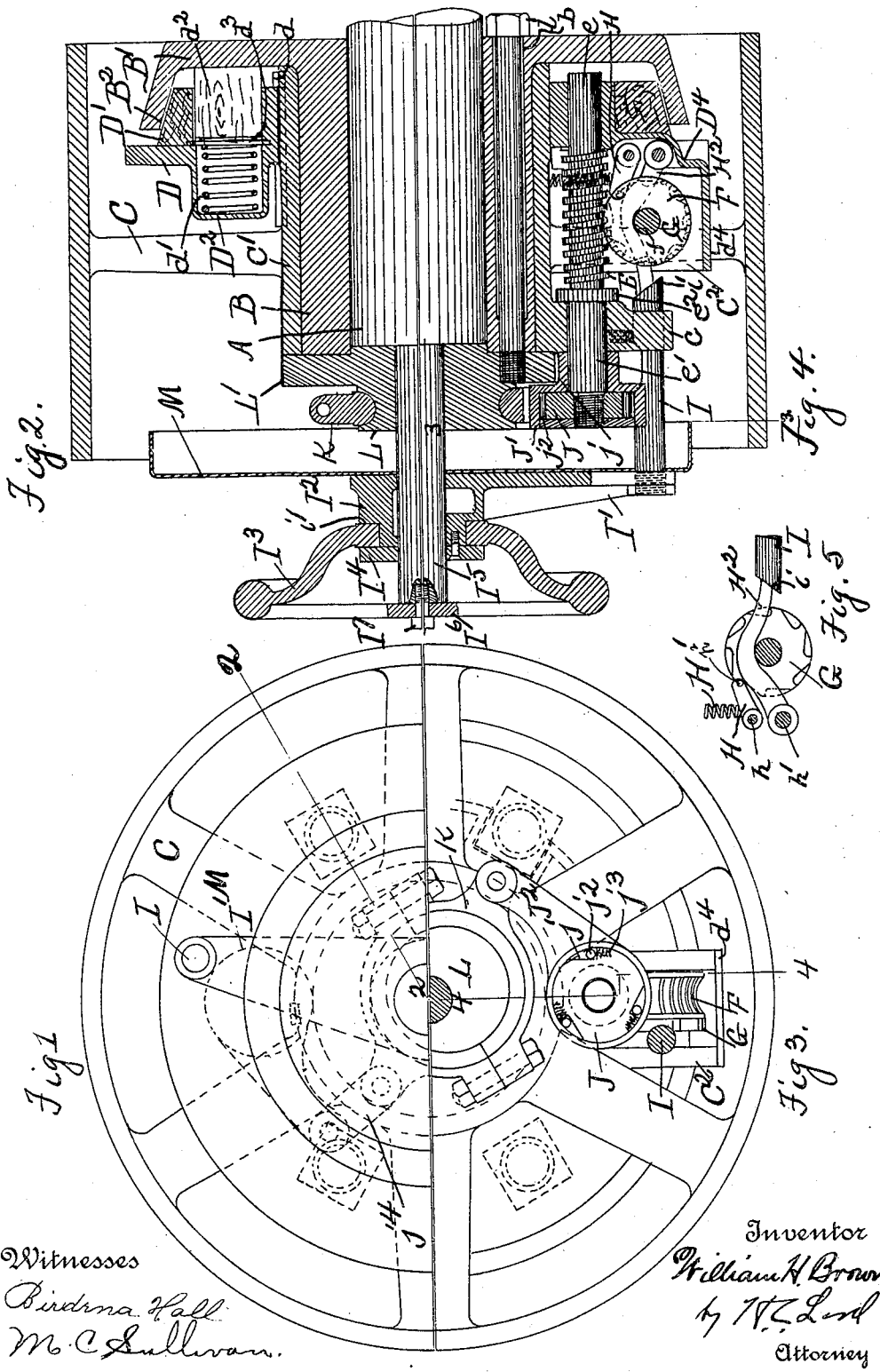

No. 792,308.                                                    Patented June 13, 1905.

UNITED STATES PATENT OFFICE.

WILLIAM H. BROWN, OF ERIE, PENNSYLVANIA, ASSIGNOR TO THE TAPER SLEEVE PULLEY COMPANY, OF ERIE, PENNSYLVANIA, A CORPORATION.

FRICTION-CLUTCH.

SPECIFICATION forming part of Letters Patent No. 792,308, dated June 13, 1905.

Application filed March 28, 1904. Serial No. 200,381.

*To all whom it may concern:*

Be it known that I, WILLIAM H. BROWN, a citizen of the United States, residing at Erie, in the county of Erie and State of Pennsylvania, have invented new and useful Improvements in Friction-Clutches, of which the following is a specification.

This invention relates to friction-clutches; and it consists in certain improvements in the construction thereof, as will be more fully described, and pointed out in the claims.

More particularly, the invention relates to that class of friction-clutches in which the clutch members are forced into engagement by the relative movement of the driving and driven elements of the clutch. Such clutches are common. With these clutches as now made the release is ordinarily made as slowly as the setting movement. In my invention the release is practically instantaneous and is to a large extent independent of the setting mechanism. This and details of construction comprise my invention.

The invention is illustrated in the accompanying drawings as follows:

Figure 1 shows a side elevation of a half of the clutch mechanism; Fig. 2, a section on the line 2 2 in Fig. 1; Fig. 3, a side elevation of the clutch, the operating hand-wheel and inclosing case being removed to better show construction. Fig. 4 is a section on the line 4 4 in Fig. 3. Fig. 5 is a detailed construction of the release mechanism.

A marks the shaft on which the clutch is mounted. On this shaft is mounted one of the elements of the clutch B, which for convenience of description we will term the "driving" element. It will of course be understood that this may be made the driven element without change of mechanism.

C marks the driven element.

The driving element B has the flange B', from which there is the internal cone friction-surface $B^2$.

Keyed on the hub of the pulley C, which is the driven element, is the cone D'. This is formed of wood and is arranged on the cone-carrier D. The key $d$ locks the cone-carrier with the driven element. The cone is forced into engagement with the surface B through the setting action of the clutch and is thrown out of engagement by the springs $d'$. The springs $d'$ are arranged in the pockets $D^2$ and are tensioned against a wooden block $d^2$. A pin $d^3$ limits the action of the spring, so that when the clutch members are thrown out of engagement the friction on the block $d^2$ is limited.

A screw E is journaled in a flange $c$, extending from the hub C' of the driven pulley C. It is also journaled in the carrier D, the extensions $e$ and $e'$ forming the bearings for the screw. A shoulder $e^2$ on the screw-shank abuts the shoulder $c$, so as to take the thrust of the screw. The screw meshes the gear F, and while there is relative movement between the driving and driven members the screw constantly rotates in one direction, carrying with it the gear F as a nut. Arranged on one side of the gear F is the ratchet-wheel G. This gear and ratchet-wheel are mounted on the shaft $f$, which is journaled in the uprights $C^2$, extending from the carrier D. A flange $d^4$ extends over these uprights, forming an inclosure for the working parts. A pawl H is mounted on the pivot-pin $h$. This pivot-pin is arranged in the carrier D. The end of the pawl is so proportioned as to adapt it to be brought into the path of the ratchet-wheel G.

It will readily be seen that if there is relative movement between the driving and driven members there is a rotation of the screw E, and when the pawl H is brought into the path of the ratchet-wheel G it will lock the gear F, so that it will act as a nut and force the carrier D, and consequently the friction-cone D', into engagement, and this action will continue until the relative movement between the parts ceases. I provide the following mechanism for throwing the pawl into and out of engagement: A spring H' is arranged under the pawl and rests against the hub C', so that it tends to force the pawl at all times into engagement. A rock-arm $H^2$ is pivoted on the pin $h'$, mounted in the uprights $C^2$. The pin $h^2$ on the pawl H is in the path of the movement of the rock-arm H². A cam-pin I, having the cam-surface i, is mounted in the shoulder c, so that the cam-surface actuates the rock-arm H². This throws the pawl H out of engagement, so that the gear rotating on the screw as a rack releases the clutch. By withdrawing the cam-pin I the rock-arm H² is permitted to move, so that the spring H' forces the pawl into engagement with the ratchet-wheel and sets the clutch.

An eccentric L is mounted on the plate L', and this plate is secured to the driving member B by the bolt l. An eccentric-strap K is arranged on the eccentric L and is secured with the rock-arms J², one of said rock-arms having a link connection j⁴ to permit of the eccentric movement. The rock-arms J² are journaled in the extension e'. A clutch-wheel J is fixed on this extension and has the clutch-surfaces j, on which act the roller clutch-pins j². These clutch-pins are forced into engagement by the spring j³. As the rock-arms J² are rocked by the eccentric the flange J', carried by the rock-arms, engages the clutch-rollers j² intermittently and rotate the screw E so long as there is relative movement between the driving and driven members. The plate L also carries the stem I⁵, on which is mounted the operating-wheel I³, and this is swiveled on the hub I². The arms I' extend from the hub I² and are secured to the pins I. The operating-wheel I³ is mounted on the hub I² by means of the groove i', formed in the hub, the plate I⁴ permitting the assembling of the parts. A stop-plate I⁶ is secured to the end of the stem I⁵ by a stud I⁷.

To set the clutch, the operating-wheel I³ is pulled outwardly, allowing the spring I' to force in the pawl H. The relative movement of the driving and driven members is of course intermittently turning the screw E so long as the relative movement continues, and the cone D' is forced into engagement with the cone-surface B². When the operating-wheel I³ is forced inwardly, the action of the pin I on the arm H² forces the pawl H out of the ratchet-wheel and breaks the connection between the clutch member and the pressure-actuating mechanism, so that the springs D may effect the release of the clutch. It will be seen that in this the connection between the pressure device and clutch member is broken as distinguished from reversing the pressure mechanism, as is common.

It will be noted that the ratchet mechanism is equally efficient where the relative movement between the driving and driven members is in either direction, so that the clutch is applicable to mechanism driven in either direction without change of construction. While this has been accomplished by a fluid-actuated clutch with a relative movement of the members, I am not aware that it has ever been accomplished with a non-fluid-actuated pressure device. It will also be noted that the block d² precedes the surface D' in being brought into engagement. By this means the clutch is gotten under way more gradually, the surfaces d² and D' being brought into engagement successively.

It will be noted that this clutch is operated purely by mechanically-actuated devices as distinguished from fluid-actuated devices, and by the term "mechanically-actuated pressure mechanism" I do not include fluid-actuated mechanism.

What I claim as new is—

1. In a friction-clutch, the combination with the driving and driven members having friction-surfaces adapted to be brought into contact; a screw forming a pressure device for forcing said friction-surfaces into engagement; a nut operated by the screw for setting the clutch; and means for returning the nut on the screw independently of the reverse action of the screw but in engagement therewith.

2. In a friction-clutch, the combination with the driving and driven members having friction-surfaces adapted to be brought into contact; a screw arranged to operate only in one direction and having an axis parallel and eccentric to the axis of the clutch, forming a pressure device for forcing said surfaces into engagement; mechanism for actuating said screw with a relative movement of the members; and means acting independently of a reverse action of the screw for releasing the clutch.

3. In a friction-clutch, the combination of the driving and driven members having friction-surfaces adapted to be brought into engagement; a screw arranged to operate only in one direction and having its axis parallel and eccentric to the axis of the clutch, forming a pressure device for forcing said surfaces into engagement; and a release mechanism acting independently of the action of the screw for releasing said clutch.

4. In a friction-clutch the combination of the driving and driven members having friction-surfaces adapted to be brought into engagement; a screw forming a pressure device; a nut operated by the screw and arranged for forcing said surfaces into engagement when so operated; and a release mechanism acting independently of the action of the screw for returning the nut on the screw the nut being in threaded engagement with the screw during the return movement.

5. In a friction-clutch, the combination of the driving and driven members having friction-surfaces adapted to be brought into engagement; a screw arranged to operate only in one direction and having its axis parallel and eccentric to the axis of the clutch and forming a pressure device for forcing said surfaces into engagement; mechanism operated by a relative movement of the driving and driven members for actuating said screw;

and a release mechanism acting independently of the action of the screw for releasing said clutch.

6. In a friction-clutch, the combination with the driving and driven members having friction-surfaces adapted to be brought into engagement by a movement parallel to the axis of the clutch; of a pressure device for bringing said surfaces into engagement; a ratchet mechanism for operating said pressure device; and means for actuating the ratchet with one of the clutch members in motion in either direction.

7. In a friction-clutch, the combination with the driving and driven members having friction-surfaces adapted to be brought into engagement; of a pressure mechanism for bringing said surfaces into engagement, comprising an eccentric carried by one of said members and a ratchet mechanism carried by the other of said members, the eccentric actuating the ratchet mechanism with a relative movement of said members.

8. In a friction-clutch, the combination with the driving and driven members having friction-surfaces adapted to be brought into engagement; of a pressure mechanism for bringing said surfaces into engagement, comprising an eccentric carried by one of said members; a ratchet mechanism carried by the other of said members, and adapted to be operated by a relative movement of said members; a screw arranged to be rotated by said ratchet mechanism; and a connection between the screw and one of the members.

9. In a friction-clutch, the combination with the driving and driven members having friction-surfaces adapted to be brought into engagement; of a pressure mechanism for bringing said surfaces into engagement, comprising an eccentric carried by one of said members; a ratchet mechanism carried by the other of said members, and adapted to be operated by a relative movement of said members; a screw arranged to be rotated by said ratchet mechanism; a connection between the screw and one of the members; and means for breaking said connection for releasing the clutch.

10. In a friction-clutch, the combination of the driving and driven members having friction-surfaces adapted to be brought into engagement; the pawl H, ratchet-wheel and gear carried by one of said members, the pawl being adapted to lock said ratchet-wheel; said pawl being pivoted on an axis parallel to the axis of the ratchet-wheel means made active by locking said ratchet-wheel, with said pawl for setting the clutch; and a spring for throwing the friction-surfaces out of engagement as the ratchet-wheel is released from the pawl H.

11. In a friction-clutch the combination of the driving and driven members having friction-surfaces adapted to be brought into engagement; the pawl H, ratchet-wheel and gear carried by one of said members; said pawl H being pivoted on an axis parallel to the axis of the ratchet-wheel means actuated by a relative movement of the driving and driven members for bringing said surfaces into engagement when said pawl is thrown onto said ratchet-wheel; and a spring for throwing the friction-surfaces out of engagement when the ratchet-wheel is released from the pawl.

12. In a friction-clutch the combination of the driving and driven members having friction-surfaces adapted to be brought into engagement; the pawl H, ratchet-wheel and gear carried by one of said members; said pawl H being pivoted on an axis parallel to the axis of the ratchet-wheel means actuated by a relative movement of the driving and driven members for bringing said surfaces into engagement when said pawl is thrown onto said ratchet-wheel; and means for throwing said pawl out of engagement from said ratchet-wheel for releasing the clutch; and a spring for throwing the friction-surfaces out of engagement as the ratchet-wheel is released by the clutch.

13. In a friction-clutch, the combination of the driving and driven members having friction-surfaces adapted to be brought into contact; the eccentric carried by one of said members; the ratchet mechanism operated by said eccentric; the screw operated by the ratchet mechanism; the gear F operated by the screw; the ratchet-wheel G actuated by the gear F; the pawl H adapted to be brought into the path of the ratchet-wheel for setting the clutch; a swiveled actuating-wheel; means actuated by the swiveled wheel for throwing the pawl out of engagement.

14. In a friction-clutch, the combination of the driving and driven members having friction-surfaces adapted to be brought into engagement; of a mechanically-actuated pressure device between said members for setting the clutch; and means actuated by a relative movement of either of said members in either direction for operating said device to set the clutch.

15. In a friction-clutch, the combination of the driving and driven members having friction-surfaces adapted to be brought into engagement; of a mechanically-actuated pressure device comprising a screw as an element thereof; and means actuated by a relative movement of said members in either direction for operating said device to set the clutch.

16. In a friction-clutch, the combination of the driving and driven members having friction-surfaces adapted to be brought into engagement; of a mechanically-actuated pressure device comprising a screw between said members for setting the clutch; and means actuated by a relative movement of said members in either direction for operating said device to set the clutch.

17. In a friction-clutch, the combination of the driving and driven members having friction-surfaces adapted to be brought into engagement; of a mechanically-actuated pressure device between said members for setting the clutch; and means actuated by a relative movement of said members in either direction for operating said device to set the clutch, said means comprising a ratchet mechanism.

18. In a friction-clutch, the combination with the driving and driven members having friction-surfaces adapted to be brought into contact; a mechanically-actuated pressure mechanism actuated by a relative movement of the members in either direction for pressing said members into engagement; a mechanical connection between said pressure device and one of said members and means for breaking the connection to release the clutch.

19. In a friction-clutch, the combination with the driving and driven members having friction-surfaces adapted to be brought into contact; a screw forming a pressure device for forcing said friction-surfaces into engagement; mechanism for actuating said screw, said mechanism being operated with a relative movement of said members in either direction; and means for releasing said members independently of said screw.

In testimony whereof I have hereunto set my hand in the presence of two subscribing witnesses.

WILLIAM H. BROWN.

Witnesses:
C. D. HIGBY,
M. C. SULLIVAN.